(12) United States Patent
Stewart

(10) Patent No.: US 6,741,588 B1
(45) Date of Patent: May 25, 2004

(54) ELIMINATION OF OPERATIONAL LOOP-AROUND TRUNKS

(75) Inventor: Gilbert Mark Stewart, Naperville, IL (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/467,606

(22) Filed: Dec. 20, 1999

Related U.S. Application Data

(63) Continuation-in-part of application No. 08/868,391, filed on Jun. 3, 1997, now abandoned.

(51) Int. Cl.[7] .............................................. H04L 12/50
(52) U.S. Cl. ....................................... 370/376; 370/386
(58) Field of Search ................................ 370/357, 368, 370/369, 378, 372, 373, 375, 376, 379, 387, 388, 371, 386, 382

(56) References Cited

U.S. PATENT DOCUMENTS

| | | | | |
|---|---|---|---|---|
| 4,074,072 A | * | 2/1978 | Christensen et al. | ........ 370/388 |
| 4,095,055 A | * | 6/1978 | Gotoh et al. | ................. 379/274 |
| 4,213,201 A | * | 7/1980 | Gagnier et al. | ............. 370/375 |
| 4,377,859 A | * | 3/1983 | Dunning et al. | ............. 370/376 |
| 4,380,810 A | * | 4/1983 | Canniff | ........................ 370/370 |
| 5,430,716 A | * | 7/1995 | Pawelski | ..................... 370/388 |
| 5,590,129 A | * | 12/1996 | Ardon | ......................... 370/376 |
| 6,169,724 B1 | * | 1/2001 | Begum et al. | .............. 370/377 |

* cited by examiner

*Primary Examiner*—Chau Nguyen
*Assistant Examiner*—Andy Lee

(57) ABSTRACT

This invention relates to arrangements for eliminating loop-around trunks for operational calls. Such trunks are used when a single switch performs two distinct functions, such as local service and operator assistant service. In order to simplify software, the software for each of these functions is designed separately; in the prior art, if both functions are needed, two separate connections are established and are joined by the use of a loop-around trunk. In accordance with Applicant's invention, the loop-around trunk is eliminated by initially establishing a connection from a real time-slot to a virtual time-slot for the first function and from a virtual time-slot to a real time-slot for the second function; the real time-slots for receiving the call and for transmitting the call to an inter-office trunk are then connected in the switch without requiring the use of a separate loop-around trunk.

5 Claims, 3 Drawing Sheets

ELIMINATION OF OPERATIONAL LOOP-AROUND TRUNKS

CROSS-REFERENCE TO RELATED APPLICATION

This is a Continuation-in-Part Application of application Ser. No. 08/868,391 filed on Jun. 3, 1997, now abandoned.

TECHNICAL FIELD

This invention relates telecommunications trunk circuits and their relation to telecommunications switching systems.

Problem

Many modern switching systems carry out a plurality of functions such as local, toll, and local operator assistance. At the same time, the software for supporting each of these functions is maintained separately in order to allow features for each of these types of systems to be developed without requiring detailed studies of feature interactions among features of the different types of systems. Under these circumstances, it is frequently necessary for some types of calls, for example, calls between a local switch function and an operator service position system function to provide loop-around trunks in order to have a clean interface between the two types of calls. Under these circumstances an incoming call connection is established between an incoming trunk and one end of such a loop-around trunk, and a separate connection is established between the other end of the loop-around trunk and an outgoing trunk. The existence of a loop-around trunk ensures that the connection can be established within a switching system and the fact that the two connections are separate ensures that the features of one connection do not interfere with the features of the other connection. A problem of the prior art is that such loop-around trunks are expensive and must be generously engineered.

Solution

The above problem is solved and an advance is made over the prior art in accordance with Applicant's invention wherein a first "connection" is established from the incoming trunk to a virtual loop-around trunk, i.e., a "trunk" that exists only in memory, but has no physical appearance on the network, and a second "connection" is established from the other end of the virtual loop-around trunk to the outgoing trunk. After these "connections" have been established a real connection is established directly from the incoming trunk to the outgoing trunk. Advantageously, this arrangement avoids the cost of a separate hardware loop-around trunk while retaining the independence of the software for the two "connections."

In accordance with one specific embodiment of Applicant's invention, each connection is controlled by a pair of program processes (processes), one process for controlling each end of the connection. Four processes are involved in the type of connection discussed above. The processes associated with the virtual loop-around trunks communicate with the processes associated with the real trunk and return to these processes the same types of messages as would be returned if the connection were to a real loop-around trunk. As a last step, these two processes communicate with the processes for controlling the real trunks to establish the connection between the two real trunks.

DETAILED DESCRIPTION

Figure 1:
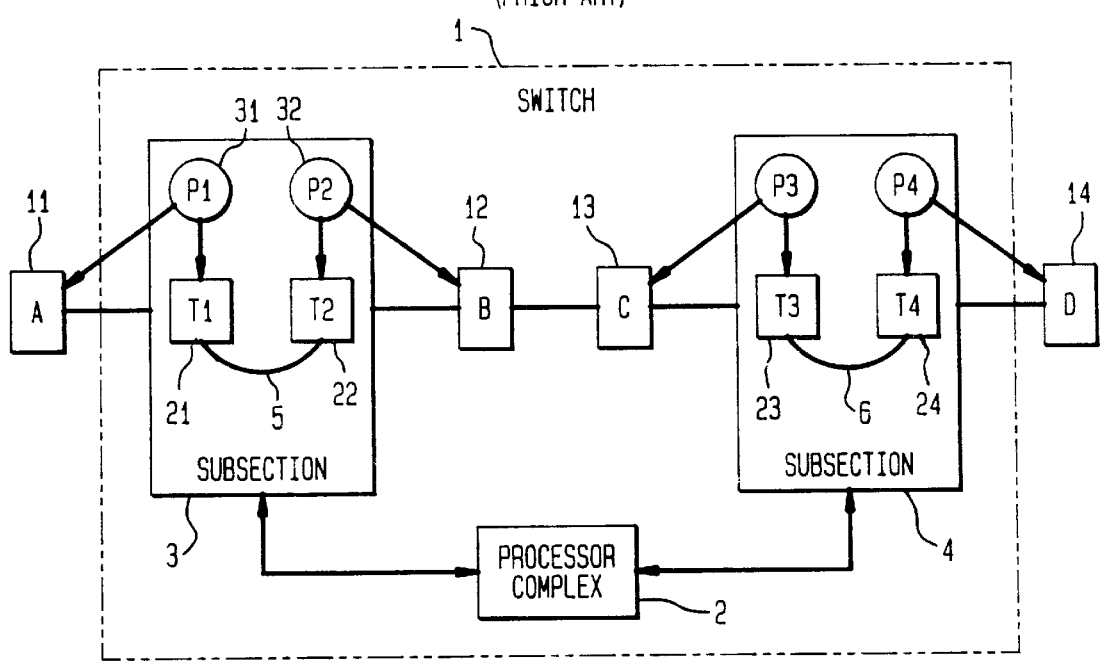
FIG. 1 is a block diagram illustrating the prior art.

FIG. 1 illustrates the prior art. A switch 1 includes subsections 3 and 4 each for controlling a different feature set of the calls established in switch 1. A common processor complex 2 controls path segments 5 and 6 in both subsections 3 and 4. The processor complex may include message paths to transmit messages between individual processors of the processor complex, the individual processors controlling separate modules of the switch. In accordance with the prior art, a connection between trunk 11 connected to subsection 3 and trunk 14 connected to subsection 4 uses a loop-around trunk shown as two separate elements, B12 and C13. A connection is established between trunk A11 and trunk B12 and a separate connection is established between trunk C13 and trunk D14. Trunks B12 and C13 are inherently connected since a loop-around trunk is an arrangement for connecting the two paths. The switch in Applicant's preferred embodiment is a digital switch and a connection 5 is established by establishing a connection between a time-slot T1 21 associated with trunk A and a time-slot T2 22 associated with loop-around trunk segment B12. Another connection 6 is established by having a separate connection from loop-around trunk segment C13 to time-slot T3 23, thence to time-slot T4 24 which is then connected to trunk D. Four processes control this connection. Process P1 31 controls trunk A and controls the selection of time-slot T1 21, process P2 32 controls the selection of time-slot T2 22 and the selection of loop-around trunk segment B12, process P3 33 control the association between loop-around trunk segment C13 and time-slot T3 23, while process P4 34 controls the selection of time-slot T4 and its connection T4 24 and its connection to trunk D14.

A Time-Slot Interchange, (TSI) contains two types of memories: a signal memory, and a control memory. Incoming time-slots are stored in an incoming signal memory from which they are transmitted under the control of the contents of a control memory to an output signal memory for feeding a next stage of TSI, or for feeding a trunk facility. The contents of the control memory are used to steer the contents of individual time-slots of the input signal memory to the appropriate locations in the output signal memory. When a request to establish a connection is made, this request leads to setting up a path by inserting appropriate addressing information into the control memory so that the appropriate input time-slots stored in the input signal memory are sent to the appropriate output time-slots of the output signal memory. The control memory is the interface between the processor and the TSI so that the processor software deals only with the control memory. A virtual time-slot is one which does not have a location in the signal memory, or which has a location in signal memory that is unconnected to transmission facilities. However, the control memory can point to such a virtual time-slot, and the processor can request connections to, and between, virtual time-slots. The request for such connections will not lead to any signals being sent between the virtual time-slots, but if such a connection is not required as in the case described herein, the software of the processor can operate as if it were establishing real paths by establishing such paths between virtual time-slots that are capable of being referred to by real addresses generated by the software of the processor. Again, there is no need to transmit signals over such virtual trunks in the system described herein, but to avoid complications in the software, it is desirable to permit the path establishment and path disconnection software to generate addresses of such virtual trunks.

Figure 2:
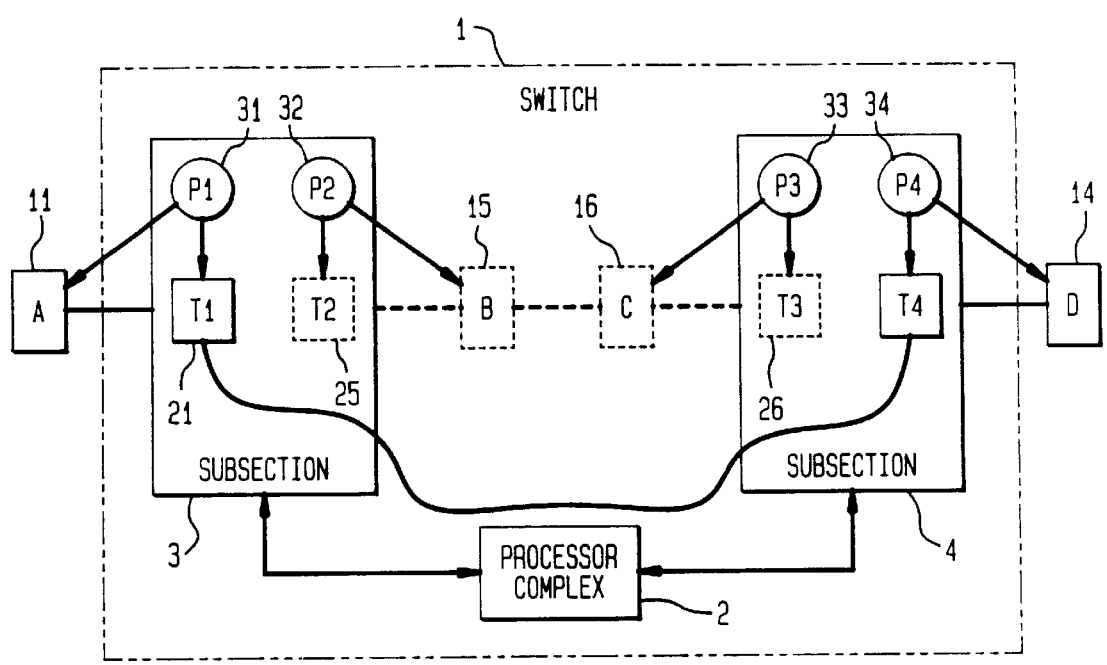
FIG. 2 is a block diagram illustrating Applicant's invention.

In accordance with Applicant's invention as shown in FIG. 2, process P1 31 is similarly associated with time-slot T1 21 and trunk A11, but process P2 32, instead of being associated with a real time-slot T2 22 and a real segment of a loop-around trunk B12, is instead associated with a virtual (non-existent) time-slot T2 25 and a virtual loop-around trunk segment B15. Process P2 32 responds to process P1 31 in the same way that it would if these virtual time-slots and loop-around trunk segments were real, i.e., sends the same types of messages that it would if these units were real. Similarly, process P3 33, instead of controlling loop-around segment C13, controls virtual loop-around segment C16 and virtual time-slot T3 26. P3 33 communicates with P4 34 in the same way as in the prior art and P4 34 selects a real time-slot T4 24 and controls real trunk D14. In the final stage of the connection processes P2 32 and P3 33 signal to their respective counterparts P1 31 and P4 34 to establish the connection between time-slots T1 21 and T4 24.

In essence, the virtual loop-around trunk receives the same voice or data that the real loop-around trunk would receive and sends the same voice or data that the real loop-around trunk would send. The only difference is that instead of exiting the switch and being converted back and forth to different forms of signaling information, the voice or data is transmitted and received to and from a single time-slot in the switch. Further, the processes controlling this time-slot behave and are programmed exactly as though they were controlling a piece of hardware whose interface to these processes is merely the transmission and receiving of this voice or data and the successful acknowledgments of each request to receive and transmit voice or data. The voice or data, however, is not being sent out of the switch, but merely left inside the switch for the other corresponding process to retrieve.

For example, in the prior art, a unit of voice or data would be deposited in a digital register in the interface unit which connects to the real trunk, B12 to C13, transmitted over this physical link, and then written to a digital register in the interface unit which connects to C13 for retrieval by process P3 in time-slot T3 23. In the invention, the time-slots T2 22 and T3 23 are replaced in the referencing processes, P1 31 and P4 34, by the endpoint time-slots, T1 21 and T4 24, respectively. The path, therefore, between the two time-slots, T1 21 and T4 24, becomes a direct path as the time-slots are communicating directly without the need for intermediate hardware, the loop-around trunk, yet the controlling processes, P1 with P4 and P2 with P3, treat these time-slots as though they are distinct hardware time-slots, exchanging control messages and receiving them. Each of these control messages are received and acknowledged by software that responds as though a successful completion of the requested action has taken place. Voice and data digital information need not be moved or copied to other registers than the two endpoints, and controlling software in processes P1 31, P2 22, P3 34, and P3 34 need not change. Ideally, the only software that would need to be modified would be that which interfaces directly with the new, virtual trunk hardware, and it would be responsible for using the existing endpoint time-slots on the far ends of the path, T1 21 and T4 24, in place of the time-slots T2 22 and T3 23 that they would have required in the absence of the invention so that the voice and data is transmitted between T1 21 and T4 24.

In this invention, the high-level controlling software in P1, P2, P3, and P4 need not know that the loop-around trunk is a virtual one. Only the software that communicates with and operates on the hardware that would be needed in the absence of this invention would have to ensure that voice or data were transmitted to and from the time-slots at the far ends of the path as though the hardware did in fact exist, thus behaving like a "virtual trunk", and ensuring that the requests made to it and the responses back properly emulate a real, operational hardware trunk interface.

Figure 3:
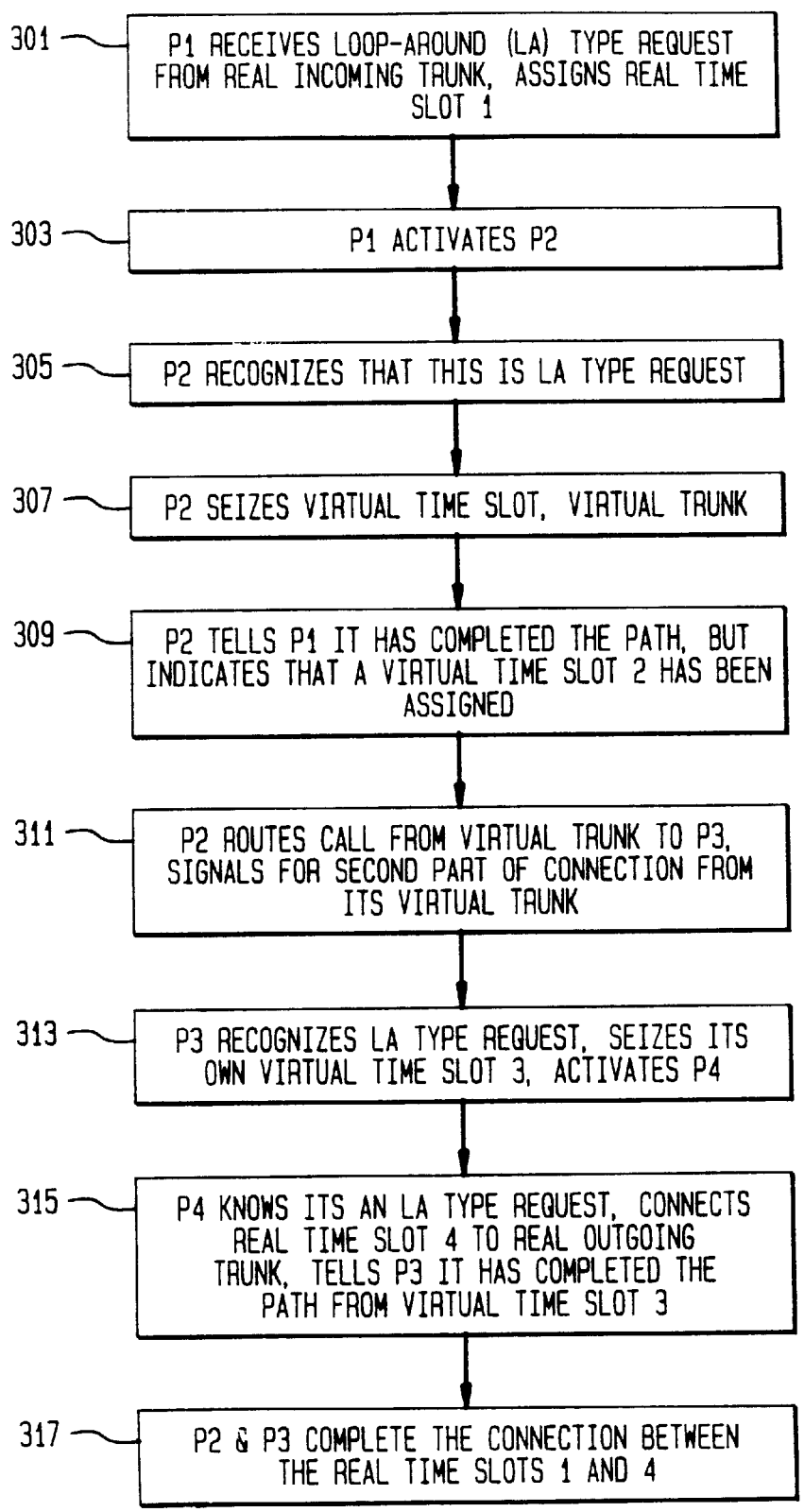
FIG. 3 is a flow diagram illustrating the establishment of a call in accordance with Applicant's invention.

FIG. 3 is a flow diagram illustrating the operation of Applicant's invention. Process P1 receives a loop-around (LA) type request from the real incoming trunk (trunk A) and assigns a real time-slot T1 (Action Block 301). P1 recognizes that this is a request which requires a loop-around type trunk or equivalent facility in accordance with Applicant's invention. P1 then activates a process P2 (Action Block 303). P2, upon receiving the activation message, knows that this is a loop-around type request (Action Block 305). P2 seizes a virtual time-slot (time-slot T2 25) and seizes a virtual loop-around trunk (15, 16) (Action Block 307). P2 then tells P1 that it has completed the path and indicates that a virtual time-slot (T2) has been assigned (Action Block 309). P1 proceeds as if the connection between T1 and virtual time-slot T2 had been established. P2 then routes the call from the virtual trunk 15, 16 to P3 and signals for the second part of the connection from its virtual trunk. The signals are essentially the same as the signals which are used in connection with the prior art arrangement (Action Block 311). P3 recognizes that this is a loop-around type request and seizes its own virtual time-slot T3 and activates process P4 (Action Block 313). P4 also knows that it is a loop-around type request and connects real time-slots T4 to real outgoing trunk (trunk B) and tells P3 that it has completed the path from virtual time-slot T3 (Action Block 315). P2 and P3 then complete the connection between real time-slots T1 and T4 (Action Block 317).

Other embodiments of this invention can readily be derived by those of ordinary skill in the art. The invention is limited only by the Claims.

What is claimed is:

1. In a switching system for establishing connections related to two types of functions, a method of establishing a call received as an incoming call for a first type of function and transmitted as an outgoing call for a second kind of function, comprising the steps of:
   receiving said call in said switch;
   seizing a real first time-slot associated with a connection for a first type of function;
   establishing a virtual connection between said first time-slot and a virtual time-slot for said first function;
   seizing a real second time-slot for said call associated with a connection for a second type of function;
   establishing a virtual connection between said second time-slot and a virtual time-slot for said second type of function; and
   connecting said real first and said real second time-slot for completing said call;
   whereby no physical loop-around trunk is required for said connection, even though said connection apparently comprises two separate connections, one for each function and uses software as if two connections were being established.

2. In a switching system for establishing connections related to two types of functions, a method of establishing a call received as an incoming call for a first type of function and transmitted as an outgoing call for a second kind of function, comprising the steps of:

receiving said call in said switch;

assigning a first process to said call;

seizing a real first time-slot associated with said first process for said call;

assigning a second process for completing said first function for said call;

said second process assigning a virtual time-slot to said call;

said second process signaling to a third process for completing said call for said second function;

assigning a virtual time-slot to said call for said third process;

assigning a fourth process for completing said call;

seizing a real second time-slot for said fourth process; and connecting said real first and said real second time-slot for completing said call;

wherein said second and third processes monitor said call as if they were connected to the two ends of a loop-around trunk and monitor said call using the same software as is used for monitoring an outgoing call for said first function and an incoming call for said second function respectively;

whereby no physical loop-around trunk is required for said connection, even though said connection apparently comprises two separate connections, one for each function and uses software as if two connections were being established.

3. The method of claim 2, wherein said switching system comprises a plurality of switching modules;

wherein the step of assigning a first process to said call comprises the step of assigning a first process to said call on a module for serving said incoming call;

wherein the step of signaling to a third process for completing said call for said second function comprises the step of signaling to a third process on a module for serving said outgoing call;

wherein the step of connecting said real first and said real second time-slot comprises the step of connecting said real first and said real second time-slot on the same module if said incoming and said outgoing calls are on the same module, and comprises the step of connecting said real time-slots via an inter-module switch arrangement if said incoming call and said outgoing call are on different modules.

4. A switching system operative under program control for establishing connections related to two types of functions, comprising:

a switching network; and processor means;

said processor means for controlling the following steps:
establishing a virtual connection between a real first time-slot and a first virtual time-slot for said first function;

seizing a real second time-slot for said call;

establishing a virtual connection between said second time-slot and a second virtual time-slot for said second type of function; and connecting said real first and said real second time-slot for completing said call;

whereby no physical loop-around trunk is required for said connection, even though said connection apparently comprises two separate connections, one for each function and uses software as if two connections were being established.

5. A switching system operative under program control for establishing connections related to two types of functions, comprising;

a switching network; and processor means;

said processor means for controlling the following steps:
detecting reception of said call in said switching system;

assigning a first process to said call;

seizing a real first time-slot associated with said first process for said call;

assigning a second process for completing said first function for said call;

said second process assigning a first virtual time-slot to said call;

said second process signaling to a third process for extending said call for said second function;

assigning a second virtual time-slot to said call for said third process;

assigning a fourth process for completing said call;

seizing a real second time-slot for said fourth process; and connecting said real first and said real second time-slot for completing said call;

wherein said second and third processes monitor said call as if they were connected to the two ends of a loop-around trunk and monitor said call using the same software as is used for monitoring an incoming call for said first function and an outgoing call for said second function respectively;

whereby no physical loop-around trunk is required for said connection, even though said connection apparently comprises two separate connections, one for each function, and uses software as if two connections were being established.

* * * * *